UNITED STATES PATENT OFFICE.

HERBERT N. McCOY, OF CHICAGO, ILLINOIS.

PROCESS OF CONCENTRATING CARNOTITE SANDSTONE.

1,195,698.     Specification of Letters Patent.     Patented Aug. 22, 1916.

No Drawing.     Application filed February 12, 1916. Serial No. 78,023.

*To all whom it may concern:*

Be it known that I, HERBERT N. MCCOY, a citizen of the United States, residing at Chicago, in the county of Cook and State of Illinois, have invented certain new and useful Improvements in Processes of Concentrating Carnotite Sandstone, of which the following is a specification.

The object of this invention is to provide a process for concentrating the values in so-called carnotite, a mineral containing uranium, vanadium and potassium, and by reason of its uranium content containing also radium. This ore is at present the principal commercial source of radium.

Pure carnotite is a very soft, bright yellow mineral, which is very rarely found in large masses. Its usual occurrence is in the form of a very thin coating upon grains of sand with which it forms a friable, yellowish sandstone, which occurs almost exclusively in Colorado and Utah. This sandstone, impregnated with carnotite, is commonly known as carnotite, although the actual percentage of the latter mineral may be quite small.

The carnotite sandstone is readily crushed so as to separate the sand granules; and when the sand so obtained is subjected to any of the well known wet or pneumatic methods of concentration, a considerable part of the carnotite may be separated as a concentrate. Such methods, especially the pneumatic method, are in extensive use. These methods, however, do not afford a clean separation for the reason that the very thin coating of carnotite adheres firmly to each sand granule. The separation is not improved by finer grinding of the sand, as the sand grains are thereby broken with the result that very fine silica passes into the concentrate with the carnotite.

I have discovered that I can secure an excellent separation as between the carnotite and the sand as follows:—The ore is crushed in such manner as to separate or detach the sand grains without fracturing the individual grains to any material extent. The sand is then sifted through a screen of about one twenty-fifth to one fiftieth of an inch aperture, and is mixed with a small quantity of water to form a sludge, one gallon of water for each fifteen pounds of the carnotite sand being a suitable proportion. The mixture is now thoroughly agitated for one or several hours in any suitable apparatus, for example a revolving barrel or drum. As a result of this treatment the coating of carnotite is worn away from the surfaces of the sand grains by a process of attrition, and is brought into such a finely-divided state that upon adding to the mixture in the drum a sufficient proportion of water, say five gallons of water to each fifteen pounds of carnotite sand, the charge readily separates into two layers, the carnotite remaining suspended in the water, and the heavy sand, each grain of which is now thoroughly freed from its coating of carnotite, settling to the bottom. The water suspension of the carnotite is decanted, and by filtering, using any well known method, the carnotite concentrate is obtained as a filter-cake, in form readily available for further treatment.

The above process is highly effective, and is based upon the recognition of the fact that the ore, so-called carnotite, consists of sand granules each having a firmly adhering coating of carnotite. The sand consists largely, or often almost wholly of silica (quartz) and is therefore very hard; whereas the carnotite is much softer and is gradually worn off by attrition, as the wet mass is agitated. I have also found that not only is the carnotite removed from the sand by this process, but that radium is likewise separated with the carnotite. In fact, it appears to be impossible to separate a considerable part of the radium from the sand, except by a process of attrition. The reason for this is that a considerable portion of the radium is embedded in the sand grains up to depths of about 0.0001 millimeter. The radium is not distributed uniformly through the sand grains, but is only embedded in the surface layer. This condition arises during the formation of the radium from uranium, in which formation the atoms of radium are shot off by recoil (compare Rutherford, "*Radio-Active Substances and Their Radiations*," 1913, page 174) with such great velocity as to cause them to penetrate the sand grains to the appreciable depths above noted. It is only by a process of attrition, as above described, that the surface layers of the sand grains can be worn away, and a complete separation obtained as between the radium and the sand.

In ordinary carnotite-bearing sandstone, such as that above referred to, there is a frequent occurrence of small fragments of solid carnotite. Some of these, reduced to the approximate size of the sand grains, may remain with the sand after the attrition and separation above described, as can be observed by the aid of a lens. In order to free the sand tailings obtained as above from these carnotite particles, the tailings are again agitated with water to which a little sulfuric, hydrochloric or other acid is added. For example, I have used two to four ounces of sulfuric or hydrochloric acid per gallon of water having added thereto the sand tailings from fifteen pounds of ore. This treatment disintegrates and in part dissolves the above mentioned carnotite particles, and yields a liquid containing dissolved carnotite, in which a radium-bearing sediment is suspended. The liquid is filtered and the filtrate worked up by appropriate methods for its uranium and vanadium contents, the filter-cake being saved for its radium content. The resulting sand tailings are practically free from uranium, vanadium, and radium.

The following data are descriptive of an illustrative operation, it being understood however that my invention is not restricted to the specific conditions recited:—The ore used was a carnotite-bearing sandstone containing 1.6 per cent. of uranium oxid and carrying about four milligrams of radium per ton. Fifteen pounds of this ore were crushed and sifted through a sixty-mesh screen, and then rotated for six hours in a twenty-five gallon barrel, with about one gallon of water. About five gallons of water were then added, the mixture thoroughly stirred, and the water (carrying practically all of the suspended slimes) poured off from the sand. The slimes were separated from the water by filtration, and dried. The dry slimes concentrate amounted to eighteen per cent. by weight of the original ore, and carried approximately eighty-five per cent. of the values. The sand, which still contained a few particles of carnotite, was mixed with one gallon of water to which three ounces of concentrated sulfuric acid were added, and the mixture was rotated in the barrel for an additional period of three hours. At the end of this time the specks of carnotite had disappeared, being largely dissolved, and a small amount of slimes had been formed, partly from the dissolved specks of carnotite, but largely from the sand by further attrition. The slimes concentrate was separated and dried as before, its weight being four per cent. of the original ore. The total weight of concentrate was therefore twenty-two per cent. The dry sand was free from values, and amounted to seventy per cent. by weight of the ore, the remaining eight per cent. being represented by moisture and soluble matter in the ore. Ninety per cent. or more of the radium, uranium, and vanadium were contained in the slimes concentrate.

The terms "carnotite" and "carnotite sands" are used herein to include such associated or allied minerals as may be amenable to treatment by this process.

I claim:—

1. The herein-described process of concentrating the values in carnotite sands, which consists in subjecting the grains thereof to a process of attrition, and separating the value-bearing slimes from the denuded grains, in presence of water.

2. The herein-described process of concentrating the values in carnotite sands, which consists in subjecting the grains thereof in the form of sludge to a process of attrition, and separating the value-bearing slimes from the denuded grains.

3. The herein-described process of concentrating the radium contents of radium-bearing sands, which consists in removing the surface portions of the sand grains by attrition, and separating the radium-bearing slimes from the denuded grains, in presence of water.

4. The herein-described process of concentrating the radium contents of radium-bearing sands, which consists in subjecting the sand grains in the form of sludge to a process of attrition to remove the surface portions thereof, and separating the radium-bearing slimes from the denuded grains.

5. The herein-described process of concentrating the values in carnotite sands, which consists in mechanically separating the carnotite incrustation from the sand grains, and thereafter subjecting the denuded grains to an acid treatment for the recovery of the values from admixed carnotite.

6. The herein-described process of concentrating the values in carnotite sands, which consists in mechanically separating the carnotite incrustation from the sand grains, and thereafter subjecting the denuded grains to a process of attrition in presence of acid for the recovery of further values.

In testimony whereof I affix my signature in presence of two witnesses.

HERBERT N. McCOY.

Witnesses:
  EDWIN D. LEMON,
  ROBERT W. CHILDS.